US011551002B2

(12) United States Patent
Sellam et al.

(10) Patent No.: US 11,551,002 B2
(45) Date of Patent: Jan. 10, 2023

(54) LEARNED EVALUATION MODEL FOR GRADING QUALITY OF NATURAL LANGUAGE GENERATION OUTPUTS

(71) Applicant: GOOGLE LLC, Mountain View, CA (US)

(72) Inventors: Thibault Sellam, New York City, NY (US); Dipanjan Das, Jersey City, NJ (US); Ankur Parikh, New York City, NY (US)

(73) Assignee: GOOGLE LLC, Mountain View, CA (US)

( * ) Notice: Subject to any disclaimer, the term of this patent is extended or adjusted under 35 U.S.C. 154(b) by 239 days.

(21) Appl. No.: 17/003,572

(22) Filed: Aug. 26, 2020

(65) Prior Publication Data

US 2022/0067285 A1 Mar. 3, 2022

(51) Int. Cl.
*G06F 40/47* (2020.01)
*G06F 40/289* (2020.01)
*G06F 40/205* (2020.01)
*G06F 40/51* (2020.01)

(52) U.S. Cl.
CPC .......... *G06F 40/289* (2020.01); *G06F 40/205* (2020.01); *G06F 40/47* (2020.01); *G06F 40/51* (2020.01)

(58) Field of Classification Search
CPC ...... G06F 40/289; G06F 40/205; G06F 40/47; G06F 40/51
See application file for complete search history.

(56) References Cited

U.S. PATENT DOCUMENTS

| | | | | |
|---|---|---|---|---|
| 2012/0101804 | A1* | 4/2012 | Roth | G06F 40/45 704/2 |
| 2016/0117316 | A1* | 4/2016 | Le | G06N 3/0445 704/9 |
| 2017/0060855 | A1* | 3/2017 | Song | G06F 40/55 |
| 2020/0210772 | A1* | 7/2020 | Bojar | G06K 9/6257 |
| 2021/0174204 | A1* | 6/2021 | Yin | G06F 16/3329 |
| 2021/0365837 | A1* | 11/2021 | Kashihara | G06F 16/36 |
| 2022/0067309 | A1* | 3/2022 | Sellam | G06F 40/30 |

OTHER PUBLICATIONS

Belz, Anja, et al., "Comparing Automatic and Human Evaluation of NLG Systems," 11th Conference of the European Chapter of the Association for Computational Linguistics, Apr. 2006, pp. 313-320.

(Continued)

*Primary Examiner* — Daniel C Washburn
*Assistant Examiner* — Paul J. Mueller
(74) *Attorney, Agent, or Firm* — Botos Churchill IP Law LLP

(57) ABSTRACT

Systems and methods for automatic evaluation of the quality of NLG outputs. In some aspects of the technology, a learned evaluation model may be pretrained first using NLG model pretraining tasks, and then with further pretraining tasks using automatically generated synthetic sentence pairs. In some cases, following pretraining, the evaluation model may be further fine-tuned using a set of human-graded sentence pairs, so that it learns to approximate the grades allocated by the human evaluators.

20 Claims, 7 Drawing Sheets

(56) References Cited

OTHER PUBLICATIONS

Callison-Burch, Chris, et al., "Re-evaluating the Role of BLEU in Machine Translation Research," 11th Conference of the European Chapter of the Association for Computational Linguistics, Apr. 2006, pp. 249-256.
Clark, Elizabeth, et al., "Sentence Mover's Similarity: Automatic Evaluation for Multi-Sentence Texts," Version 1, Proceedings of the 57th Annual Meeting of the Association for Computational Linguistics, Florence, Italy, Jul. 28 -Aug. 2, 2019, pp. 2748-2760.
Clark, Elizabeth, et al., "Sentence Mover's Similarity: Automatic Evaluation for Multi-Sentence Texts," Version 2, Proceedings of the 57th Annual Meeting of the Association for Computational Linguistics, Florence, Italy, Jul. 28 -Aug. 2, 2019 (13 pages).
Hinton, Geoffrey, et al., "Distilling the Knowledge in a Neural Network," arXiv:1503.02531 v1, Mar. 9, 2015, pp. 1-9.
Lo, Chi-Kiu, "YiSi - A unified semantic MT quality evaluation and estimation metric for languages with different levels of available resources," Proceedings of the Fourth Conference on Machine Translation (WMT), vol. 2: Shared Task Papers (Day 1), Florence, Italy, Aug. 1-2, 2019, pp. 507-513.
Mathur, Nitika, et al., "Tangled up in BLEU: Reevaluating the Evaluation of Automatic Machine Translation Evaluation Metrics," Proceedings of the 58th Annual Meeting of the Association for Computational Linguistics, The University Melbourne, Victoria, Australia, Jul. 5- 10, 2020, pp. 4984-4997.
Turc, Iulia, et al., Well-Read Students Learn Better: On The Importance Of Pre-Training Compact Models, arXiv:1908.08962v2, Sep. 25, 2019, pp. 1-13.
Turc, Iulia, et al., Well-Read Students Learn Better: The Impact Of Student Initialization On Knowledge Distillation, arXiv:1908.08962v1, Aug. 23, 2019, pp. 1-12.
Bahdanau, Dzmitry, et al., Neural Machine Translation, By Jointly Learning To Align and Translate, arXiv: 1409.0473v7, May 19, 2016, pp. 1-15.
Bannard, Colin, et al., Paraphrasing with Bilingual Parallel Corpora, Proceedings of the 43rd Annual Meeting of the ACL, pp. 597-604, Ann Arbor, Jun. 2005, Association for Computational Linguistics.
Belinkov, Yonatan, et al., Synthetic and Natural Noise Both Break Neural Machine Translation, Published as a conference paper at ICLR 2018, pp. 1-13, 2018.
Bojar, Ondrej, Results of the WMT16 Metrics Shared Task, Proceedings of the First Conference on Machine Translation, vol. 2: Shared Task Papers, pp. 199-231, 2016.
Bojar, Ondrej, et al., Results of the WMT17 Metrics Shared Task, Proceedings of the Conference on Machine Translation (WMT), vol. 2: Shared Task Papers, pp. 489-513,2017.
Bowman, Samuel, et al., A large annotated corpus for learning natural language inference, Proceedings of the 2015 Conference on Empirical Methods in Natural Language Processing, pp. 632-642, 2015.
Celikyilmaz, Asli, et al., Evaluation of Text Generation: A Survey, arXiv:2006.14799v1, Jun. 26, 2020, pp. 1-58.
Chaganty, Arun Tejasvi, et al., The price of debiasing automatic metrics in natural Tanguage evaluation, Proceedings of the 56th Annual Meeting of the Association for Computational Linguistics (Long Papers), pp. 643-653, 2018.
Chen, Qian, et al., Enhanced LSTM for Natural Language Inference, Proceedings of the 55th Annual Meeting of the Association for Computational Linguistics, pp. 1657-1668, 2 017.
Chopra, Sumit, et al., Abstractive Sentence Summarization with Attentive Recurrent Neural Networks, Proceedings of NAACL-HLT 2016, pp. 93-98, 2016.
Devlin, Jacob, et al., BERT: Pre-training of Deep Bidirectional Transformers for Language Understanding, Proceedings of NAACL-HLT 2019, pp. 4171-4186, 2019.
Dusek, Ondrej, et al., Automatic Quality Estimation for Natural Language Generation Ranting (Jointly Rating and Ranking), In Proceedings of INLG, Tokyo, Japan, Oct. 10, 2019, arXiv:1910.04731 v1, pp. 1-9.
Dusek, Ondrej, et al., Automatic Quality Estimation for Natural Language Generation Ranting (Jointly Rating and Ranking), Proceedings of The 12th International Conference on Natural Language Generation, pp. 369-376, 2019.
Dusek, Ondrej, et al., Referenceless Quality Estimation for Natural Language Generation, arXiv:1708.01759v1, Aug. 5, 2017, pp. 1-9.
Eyal, Matan, et al., Question Answering as an Automatic Evaluation Metric for News Article Summarization, Proceedings of NAACL-HLT 2019, pp. 3938-3948, 2019.
Fang, Hao, et al., From Captions to Visual Concepts and Back, CVPR 2015, pp. 1-10, 2015.
Ganitkevitch, Juri , et al.,PPDB: The Paraphrase Database, Proceedings of NAACL-HLT 2013, pp. 758-764, 2013.
Gardent, Claire, et al., The WebNLG Challenge: Generating Text from RDF Data, Proceedings of The 10th International Natural Language Generation conference, p. 124 133,2017.
Goodrich, Ben, et al., Assessing The Factual Accuracy of Generated Text, Research Track Paper, KDD '19, Aug. 4-8, 2019, Anchorage, Ak, USA, pp. 166-175.
Iyyer, Mohit, et al., Adversarial Example Generation with Syntactically Controlled Paraphrase Networks, Proceedings of NAACL-HLT 2018, pp. 1875-1885, 2018.
Jia, Robin , et al., Adversarial Examples for Evaluating Reading Comprehension Systems, Proceedings of the 2017 Conference on Empirical Methods in Natural Language Processing, pp. 2021-2031,2017.
Koehn, Philipp, Statistical Machine Translation, Cambridge University Press, (excerpts), Copyright 2010, pp. 217-246.
Kukich, Karen, Design of a Knowledge-Based Report Generator, University of Pittsburgh, Bell Telephone Laboratories, pp. 145-150,1983.
Lin, Chin-Yew, Rouge: A Package for Automatic Evaluation of Summaries, In Proceedings of Workshop on Text Summarization Branches Out, Post-Conference Workshop of ACL 2004, pp. 1-10, 2004.
Liu, Chia-Wei , et al., How NOT To Evaluate Your Dialogue System: An Empirical Study of Unsupervised Evaluation Metrics for Dialogue Response Generation, Proceedings of the 2016 Conference on Empirical Methods in Natural Language Processing, pp. 2122-2132, 2016.
Liu, Yinhan, RoBERTa: A Robustly Optimized BERT Pretraining Approach, arXiv:1907.11692v1, Jul. 26, 2019, pp. 1-13.
Ma, Qingsong, et al., Blend: a Novel Combined MT Metric Based on Direct Assessment, CASICT-DCU submission to WMT17 Metrics Task, Proceedings of the Conference on Machine Translation (WMT), vol. 2: Shared Task Papers, pp. 598-603, 2017.
Ma, Qingsong, et al., Results of the WMT18 Metrics Shared Task, Proceedings of the Third Conference on Machine Translation (WMT), vol. 2: Shared Task Papers, pp. 671-688, 2018.
Ma, Qingsong, et al., Results of the WMT19 Metrics Shared Task: Segment-Level and Strong MT Systems Pose Big Challenges, Proceedings of the Fourth Conference on Machine Translation (WMT), vol. 2: Shared Task Papers (Day 1) pp. 62-90, 2019.
Mani, Inderjeet, et al., Advances In Automatic Text Summarization, The MIT Press, Kexcerpts) Copyright 1999, pp. 283-339.
Mathur, Nitika, et al., Putting Evaluation in Context: Contextual Embeddings improve Machine Translation Evaluation, Proceedings of the 57th Annual Meeting of the Association for Computational Linguistics, pp. 2799-2808, 2019.
Novikova, Jekaterina, et al., Why We Need New Evaluation Metrics for NLG, Proceedings of the 2017 Conference on Empirical Methods in Natural Language Processing, pp. 2241-2252, 2017.
Papineni, Kishore, et al., BLEU: a Method for Automatic Evaluation of Machine Translation, Proceedings of the 40th Annual Meeting of the Association for Computational Linguistics (ACL), Philadelphia, Jul. 2002, pp. 311-318.
Ribeiro, Marco Tulio, et al., Semantically Equivalent Adversarial Rules for Debugging NLP Models, Proceedings of the 56th Annual Meeting of the Association for Computational Linguistics (Long Papers), pp. 856-865, 2018.
Sellam, Thibault, et al., BLEURT: Learning Robust Metrics for Text Generation, arXiv:2004.04696v1, Apr. 9, 2020, pp. 1-12.

(56) References Cited

OTHER PUBLICATIONS

Sellam, Thibault, et al., BLEURT: Learning Robust Metrics for Text Generation, arXiv:2004.04696v2, May 11, 2020, pp. 1-12.
Sellam, Thibault, et al., BLEURT: Learning Robust Metrics for Text Generation, arXiv:2004.04696v3, May 14, 2020, pp. 1-12.
Sellam, Thibault, Bleurt: Learning Robust Metrics for Text Generation, arXiv:2004.04696v4, May 20, 2020, pp. 1-12.
Sellam, Thibault, et al., BLEURT: Learning Robust Metrics for Text Generation, arXiv:2004.04696v5, May 21, 2020, pp. 1-12.
Sellam, Thibault, et al., Evaluating Natural Language Generation with BLEURT, Google AI Blog: Evaluating Natural Language Generation with BLEURT, May 26, 2020, https://ai.googleblog.com/2020/05/evaluating-natural-language-generation.html, pp. 1-5.
Sennrich, Rico, etaL, Improving Neural Machine Translation Models with Monolingual Data, Proceedings of the 54th Annual Meeting of the Association for Computational Linguistics, pp. 86-96, 2016.
Shimanaka, Hiroki, et al., RUSE: Regressor Using Sentence Embeddings for Automatic Machine Translation Evaluation, Proceedings of the Third Conference on Machine Translation KWMT), vol. 2: Shared Task Papers, pp. 751-758, 2018.
Shimorina, Anastasia, et al., WebNLG Challenge: Human Evaluation Results, Jan. 15, 2018, pp. 1-16.
Smith, Ronnie W., et al., Spoken Natural Language Dialog Systems, A Practical Approach, Oxford University Press (excerpts), 1994, pp. 181-239.
Stanojevic, Milos, et al., BEER: BEtter Evaluation as Ranking, Proceedings of the Ninth Workshop on Statistical Machine Translation, p. 414—419, 2014.
Sutskever, Ilya, et al., Sequence to Sequence Learning with Neural Networks, arXiv:1409.3215v3, Dec. 14, 2014.
Tian, Ran, et al., Sticking To the Facts: Confident Decoding for Faithful Data-To-Text Generation, arXiv:1910.08684v1, Oct. 19, 2019, pp. 1-12.
Tian, Ran, et al., Sticking To the Facts: Confident Decoding for Faithful Data-To-Text Generation, arXiv:1910.08684v2, Nov. 15, 2019, pp. 1-16.
Tomar, Gaurav Singh, et al., Neural Paraphrase Identification of Questions with Noisy Pretraining, Proceedings of the First Workshop on Subword and Character Level Models in NLP, pp. 142-147, 2017.
Vaswani, Ashish, et al., Attention Is All You Need, 31st Conference on Neural Information Processing Systems (NIPS 2017), pp. 1-11, 2017.
Mnyals, Orio, et al., A Neural Conversational Model, arXiv: 1506.05869v3, Jul. 22, 2015, pp. 1-8.
Wang, Alex, et al., Glue: A Multi-Task Benchmark and Analysis Platform for Natural Language Understanding, Proceedings of the 2018 EMNLP Workshop BlackboxNLP Analyzing and Interpreting Neural Networks for NLP, pp. 353-355, 2018.
Wang, Alex, et al., Glue: a Multi-Task Benchmark and Analysis Platform for Natural Language Understanding, Published as a conference paper at ICLR 2019, arXiv: 1804.07461 v3, Feb. 22, 2019, pp. 1-20.
Wieting, John, et al., Towards Universal Paraphrastic Sentence Embeddings, Published as a conference paper at ICLR 2016, arXiv:1511.08198v3, Mar. 4, 2016, pp. 1-19.
Williams, Adina, et al., A Broad-Coverage Challenge Corpus for Sentence Understanding through Inference, Proceedings of NAACL-HLT 2018, pp. 1112-1122, 2018.
Wiseman, Sam, et al., Challenges in Data-to-Document Generation, Proceedings of the 2017 Conference on Empirical Methods in Natural Language Processing, pp. 2253-2263, 2017.
Xenouleas, Stratos, et al., SUM-QE: a BERT-based Summary Quality Estimation Model, Proceedings of the 2019 Conference on Empirical Methods in Natural Language Processing and the 9th International Joint Conference on Natural Language Processing, pp. 6005-6011, 2019.
Zhang, Tianyi, et al., Bertscore: Evaluating Text Generation with BERT, arXiv:1904.09675v1, Apr. 21, 2019.
Zhang, Tianyi, et al., Bertscore: Evaluating Text Generation With Bert, arXiv:1904.09675v3, Feb. 24, 2020, pp. 1-43.
Zhang, Tianyi, et al., Bertscore: Evaluating Text Generation With Bert, arXiv:1904.09675v2, Oct. 1, 2019, pp. 1-41.
Zhao, Wei, et al., "MoverScore: Text Generation Evaluating with Contextualized Embeddings and Earth Mover Distance", Proceedings of the 2019 Conference on Empirical Methods in Natural Language Processing and the 9th International Joint Conference on Natural Language Processing, pp. 563-578, 2019.

* cited by examiner

- 202 — Pretraining
  - 204 — NLG Pretraining Tasks
    - 206 — Masked Language Modeling Tasks
    - 208 — Next-Sentence Prediction Tasks
  - 210 — Pretraining Using Synthetic Sentence Pairs
    - 212 — Generate synthetic sentence pairs from source documents using:
      - 214 — Random substitutions
      - 216 — Random omissions
      - 218 — Backtranslation
    - 220 — Encode each sentence pair with training signals based on:
      - 222 — Synthetic Sentence Pair Generation Flag
      - 224 — Automatic Metrics
      - 226 — Learned Backtranslation Prediction Model
      - 228 — Learned Textual Entailment Model
    - 230 — Train evaluation model to predict/approximate:
      - 232 — The synthetic sentence pair generation flag using classification loss
      - 234 — Each automatic metric's output using regression loss
      - 236 — The backtranslation prediction model's output using regression loss
      - 238 — The textual entailment model's output using classification loss
- 240 — Fine-Tuning
  - 242 — Using a set of human-graded sentence pairs, train evaluation model to approximate the grades allocated by the human evaluators

LEARNED EVALUATION MODEL FOR GRADING QUALITY OF NATURAL LANGUAGE GENERATION OUTPUTS

BACKGROUND

In recent years, research in natural language generation ("NLG") has made tremendous progress, with models now able to translate text, summarize articles, engage in conversation, and comment on pictures with unprecedented accuracy, using approaches with increasingly high levels of sophistication. The pace of development in this area has created a need for an efficient way of evaluating the quality (e.g., accuracy and fluency) of an NLG model's output. Currently, there are two general approaches to evaluating the performance of NLG systems: human evaluation and automatic metrics. Human evaluation typically involves a large-scale quality survey for each new version of an NLG model in which human evaluators grade the NLG model's outputs, e.g., by comparing how well a sentence created by an NLG model matches the meaning and fluency of a reference sentence created by a human. While humans are unrivaled in their ability to flexibly interpret and compare language samples, using human evaluators for large-scale tests can be prohibitively time- and labor-intensive. On the other hand, existing automatic metrics are efficient and can be run on demand, but can be overly literal and provide inconsistent results compared to human evaluators.

BRIEF SUMMARY

The present technology relates to improved systems and methods for automatic evaluation of the quality of NLG outputs. In that regard, in some aspects of the technology, a learned evaluation model may be pretrained first using NLG model pretraining tasks, and then with further pretraining tasks using automatically generated ("synthetic") sentence pairs. In some aspects, following pretraining, the evaluation model may be further fine-tuned using a set of human-graded sentence pairs, so it learns to approximate the grades allocated by the human evaluators. Using this combination of pretraining and fine-tuning steps, the evaluation model can produce grades that are up to 48% more accurate (relative to human gradings) than other automatic metrics such as the BLEU metric.

In one aspect, the disclosure describes a method of training a neural network, comprising: (i) generating, by one or more processors of a processing system, a plurality of synthetic sentence pairs, each synthetic sentence pair of the plurality of synthetic sentence pairs comprising an original passage of text and a modified passage of text; (ii) generating, by the one or more processors, for each given synthetic sentence pair of the plurality of synthetic sentence pairs: a first training signal of a plurality of training signals based on whether the given synthetic sentence pair was generated using backtranslation; and one or more second training signals of the plurality of training signals based on a prediction from a backtranslation prediction model regarding a likelihood that one of the original passage of text or the modified passage of text of the given synthetic sentence pair could have been generated by backtranslating the other one of the original passage of text or the modified passage of text of the given synthetic sentence pair; (iii) pretraining, by the one or more processors, the neural network to predict, for each given synthetic sentence pair of the plurality of synthetic sentence pairs, the plurality of training signals for the given synthetic sentence pair; and (iv) fine-tuning, by the one or more processors, the neural network to predict, for each given human-graded sentence pair of a plurality of human-graded sentence pairs, a grade allocated by a human grader to the given human-graded sentence pair. In some aspects, the method further comprises: pretraining, by the one or more processors, the neural network to predict a mask token in each of a plurality of masked language modeling tasks; and pretraining, by the one or more processors, the neural network to predict, for each given next-sentence prediction task of a plurality of next-sentence prediction tasks, whether a second passage of text of the given next-sentence prediction task directly follows a first passage of text of the given next-sentence prediction task. In some aspects, the method further comprises: generating, by the one or more processors, the plurality of masked language modeling tasks; and generating, by the one or more processors, the plurality of next-sentence prediction tasks. In some aspects, generating the plurality of synthetic sentence pairs comprises, for each given synthetic sentence pair of a first subset of the synthetic sentence pairs: translating, by the one or more processors, the original passage of text of the given synthetic sentence pair from a first language into a second language, to create a translated passage of text; and translating, by the one or more processors, the translated passage of text from the second language into the first language, to create the modified passage of text of the given synthetic sentence pair. In some aspects, generating the plurality of synthetic sentence pairs comprises, for each given synthetic sentence pair of a second subset of the synthetic sentence pairs, substituting one or more words of the original passage of text of the given synthetic sentence pair to create the modified passage of text of the given synthetic sentence pair. In some aspects, generating the plurality of synthetic sentence pairs further comprises, for each given synthetic sentence pair of a third subset of the synthetic sentence pairs, removing one or more words of the original passage of text of the given synthetic sentence pair to create the modified passage of text of the given synthetic sentence pair. In some aspects, the method further comprises generating, by the one or more processors, for each given synthetic sentence pair of the plurality of synthetic sentence pairs: one or more third training signals of the plurality of training signals based on one or more scores generated by comparing the original passage of text of the given synthetic sentence pair to the modified passage of text of the given synthetic sentence pair using one or more automatic metrics. In some aspects, the one or more automatic metrics includes at least one of the BLEU metric, the ROUGE metric, or the BERTscore metric. In some aspects, the method further comprises generating, by the one or more processors, for each given synthetic sentence pair of the plurality of synthetic sentence pairs: one or more fourth training signals of the plurality of training signals based on a prediction from a textual entailment model regarding a likelihood that the modified passage of text of the given synthetic sentence pair entails or contradicts the original passage of text of the given synthetic sentence pair. In some aspects, the method further comprises generating, by the one or more processors, for each given synthetic sentence pair of the plurality of synthetic sentence pairs: one or more fourth training signals of the plurality of training signals based on a prediction from a textual entailment model regarding a likelihood that the modified passage of text of the given synthetic sentence pair entails or contradicts the original passage of text of the given synthetic sentence pair.

In another aspect, the disclosure describes a processing system comprising: a memory; and one or more processors coupled to the memory. The one or more processors are configured to: (i) generate a plurality of synthetic sentence pairs, each synthetic sentence pair of the plurality of synthetic sentence pairs comprising an original passage of text and a modified passage of text; (ii) generate, for each given synthetic sentence pair of the plurality of synthetic sentence pairs: a first training signal of a plurality of training signals based on whether the given synthetic sentence pair was generated using backtranslation; and one or more second training signals of the plurality of training signals based on a prediction from a backtranslation prediction model regarding a likelihood that one of the original passage of text or the modified passage of text of the given synthetic sentence pair could have been generated by backtranslating the other one of the original passage of text or the modified passage of text of the given synthetic sentence pair; (iii) pretrain the neural network to predict, for each given synthetic sentence pair of the plurality of synthetic sentence pairs, the plurality of training signals for the given synthetic sentence pair; and (iv) fine-tune the neural network to predict, for each given human-graded sentence pair of a plurality of human-graded sentence pairs, a grade allocated by a human grader to the given human-graded sentence pair. In some aspects, the one or more processors are further configured to: pretrain the neural network to predict a mask token in each of a plurality of masked language modeling tasks; and pretrain the neural network to predict, for each given next-sentence prediction task of a plurality of next-sentence prediction tasks, whether a second passage of text of the given next-sentence prediction task directly follows a first passage of text of the given next-sentence prediction task. In some aspects, the one or more processors are further configured to: generate the plurality of masked language modeling tasks; and generate the plurality of next-sentence prediction tasks. In some aspects, the one or more processors being configured to generate the plurality of synthetic sentence pairs comprises being configured to, for each given synthetic sentence pair of a first subset of the synthetic sentence pairs: translate the original passage of text of the given synthetic sentence pair from a first language into a second language, to create a translated passage of text; and translate the translated passage of text from the second language into the first language, to create the modified passage of text of the given synthetic sentence pair. In some aspects, one or more processors being configured to generate the plurality of synthetic sentence pairs further comprises being configured to, for each given synthetic sentence pair of a second subset of the synthetic sentence pairs, substitute one or more words of the original passage of text of the given synthetic sentence pair to create the modified passage of text of the given synthetic sentence pair. In some aspects, the one or more processors being configured to generate the plurality of synthetic sentence pairs further comprises being configured to, for each given synthetic sentence pair of a third subset of the synthetic sentence pairs, remove one or more words of the original passage of text of the given synthetic sentence pair to create the modified passage of text of the given synthetic sentence pair. In some aspects, the one or more processors are further configured to generate, for each given synthetic sentence pair of the plurality of synthetic sentence pairs: one or more third training signals of the plurality of training signals based on one or more scores generated by comparing the original passage of text of the given synthetic sentence pair to the modified passage of text of the given synthetic sentence pair using one or more automatic metrics. In some aspects, the one or more automatic metrics includes at least one of the BLEU metric, the ROUGE metric, or the BERTscore metric. In some aspects, the one or more processors are further configured to generate, for each given synthetic sentence pair of the plurality of synthetic sentence pairs: one or more fourth training signals of the plurality of training signals based on a prediction from a textual entailment model regarding a likelihood that the modified passage of text of the given synthetic sentence pair entails or contradicts the original passage of text of the given synthetic sentence pair. In some aspects, the one or more processors are further configured to generate, for each given synthetic sentence pair of the plurality of synthetic sentence pairs: one or more fourth training signals of the plurality of training signals based on a prediction from a textual entailment model regarding a likelihood that the modified passage of text of the given synthetic sentence pair entails or contradicts the original passage of text of the given synthetic sentence pair.

BRIEF DESCRIPTION OF THE DRAWINGS

FIG. 2 depicts an example training protocol showing how an evaluation model may be pretrained and fine-tuned, according to aspects of the disclosure.

DETAILED DESCRIPTION

Figure 1:
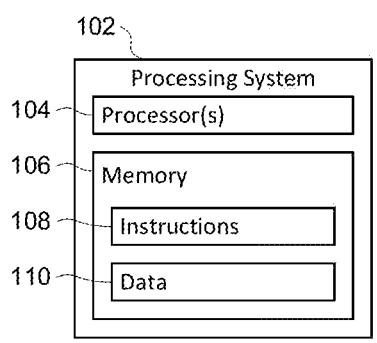
FIG. 1 is a functional diagram of an example system in accordance with aspects of the disclosure.

The present technology will now be described with respect to the following exemplary systems and methods.
Example Systems A high-level system diagram 100 of an exemplary processing system for performing the methods described herein is shown in FIG. 1. The processing system 102 may include one or more processors 104 and memory 106 storing instructions 108 and data 110. The instructions 108 and data 110 may include the evaluation model described herein, as well as some or all of the data used in pretraining and/or fine-tuning of the evaluation model. Similarly, the instructions 108 and data 110 may include the NLG model described herein. However, any of the evaluation model, NLG model, pretraining data, and/or fine-tuning data may also be maintained on one or more separate processing systems or storage devices to which the processing system 102 has access. For example, the evaluation model could be stored on a cloud-computing system, in which case the processing system 102 may provide input to, receive output from, and make changes to the evaluation model via one or more networks (not shown) in order to perform the pretraining and fine-tuning described herein. Likewise, the pretraining data and/or fine-tuning data may be stored on one or more remote servers, such as web servers, in which case the processing system 102 may retrieve data from such web servers and provide it to the evaluation model.

Processing system 102 may be implemented on any type of computing device(s), such as any type of general computing device, server, or set thereof, and may further include other components typically present in general purpose computing devices or servers. Memory 106 stores information accessible by the one or more processors 104, including instructions 108 and data 110 that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Pretraining Evaluation Model Using NLG Pretraining Tasks

FIG. 2 depicts an example training protocol 200 showing how an evaluation model may be pretrained and fine-tuned according to aspects of the disclosure. In the example of FIG. 2, the evaluation model is a deep neural network with any suitable number of layers, units, heads, etc. For example, in some aspects of the technology, the evaluation model may be based on a multi-layer bidirectional transformer such as the architecture used for the Bidirectional Encoder Representations from Transformers ("BERT") language model. In that regard, in some aspects, the evaluation model may be based on a BERT-style transformer with 12 layers, 768 hidden units, and 12 heads. Likewise, in some aspects, the evaluation model may be based on a BERT-style transformer with 24 layers, 1024 hidden units, and 16 heads.

As shown in element 202 of FIG. 2, the evaluation model may be pretrained first using one or more types of NLG pretraining tasks 204. This may comprise any type or types of pretraining tasks suitable for imparting general language comprehension to the evaluation model. For example, as shown in the illustrative training protocol 200 of FIG. 2, the evaluation model may be trained using a set of masked language modeling tasks (as indicated in element 206) and/or a set of next-sentence prediction tasks (as indicated in element 208).

Figure 3:
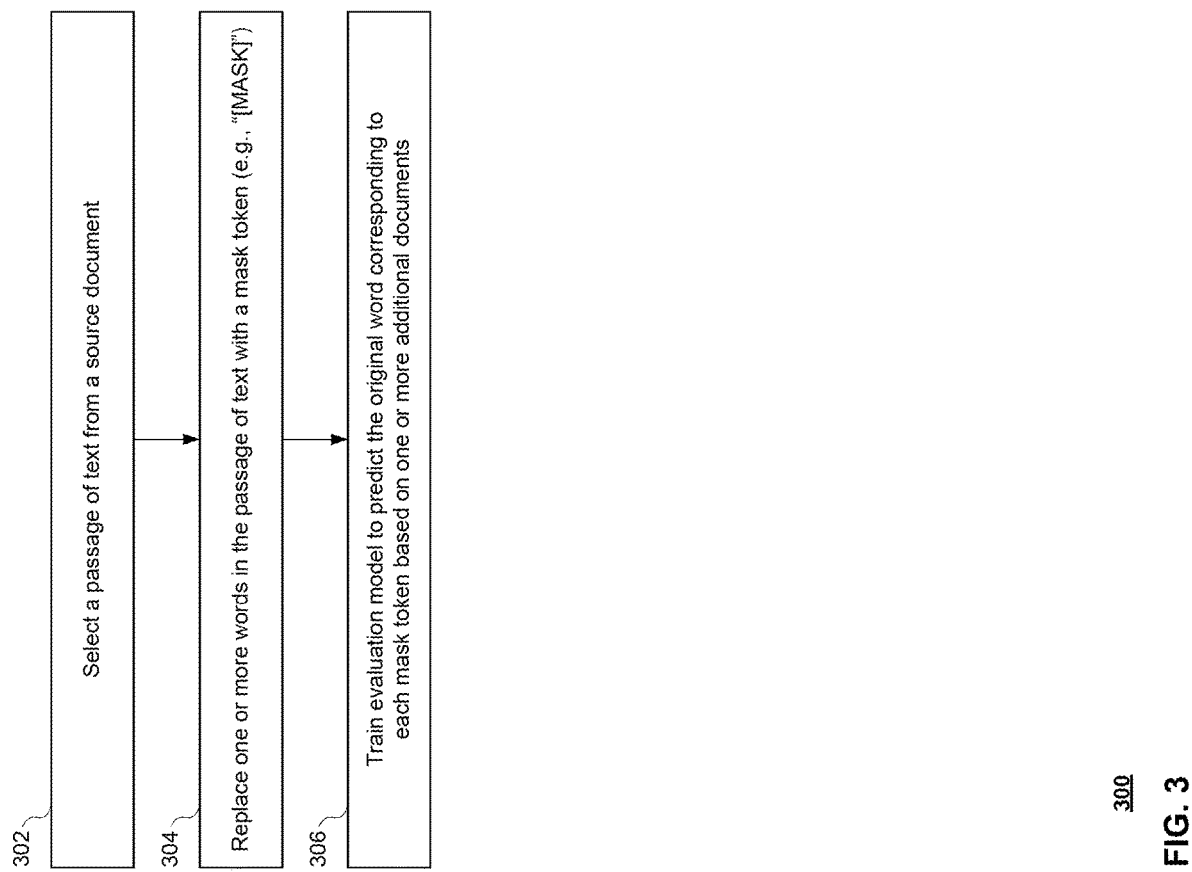
FIG. 3 is a flow diagram showing an exemplary method for pretraining the evaluation model using a masked language modeling task, according to aspects of the disclosure.

With further regard to element 206, FIG. 3 is a flow diagram showing an exemplary method 300 for pretraining the evaluation model using a masked language modeling task, according to aspects of the disclosure. In that regard, in step 302, a passage of text (e.g., a sentence fragment, sentence, multiple sentences) is harvested from a source document (e.g., a webpage from Wikipedia, a book, a news article). In step 304, one or more words from the passage are replaced with a mask token (e.g., "[MASK]"). Steps 302 and 304 may be performed manually (e.g., by a human), or automatically (e.g., by the evaluation model, by some other component of processing system 102, by some other processing system). Finally, in step 306, the evaluation model is trained to predict the original word corresponding to each mask token based at least in part on one or more additional documents from a knowledge corpus (e.g., other webpages from Wikipedia, other books, other news articles). The evaluation model may be trained using any suitable loss function, such as a cross-entropy loss between the evaluation model's prediction and the known answer of each masked language modeling task.

Figure 4:
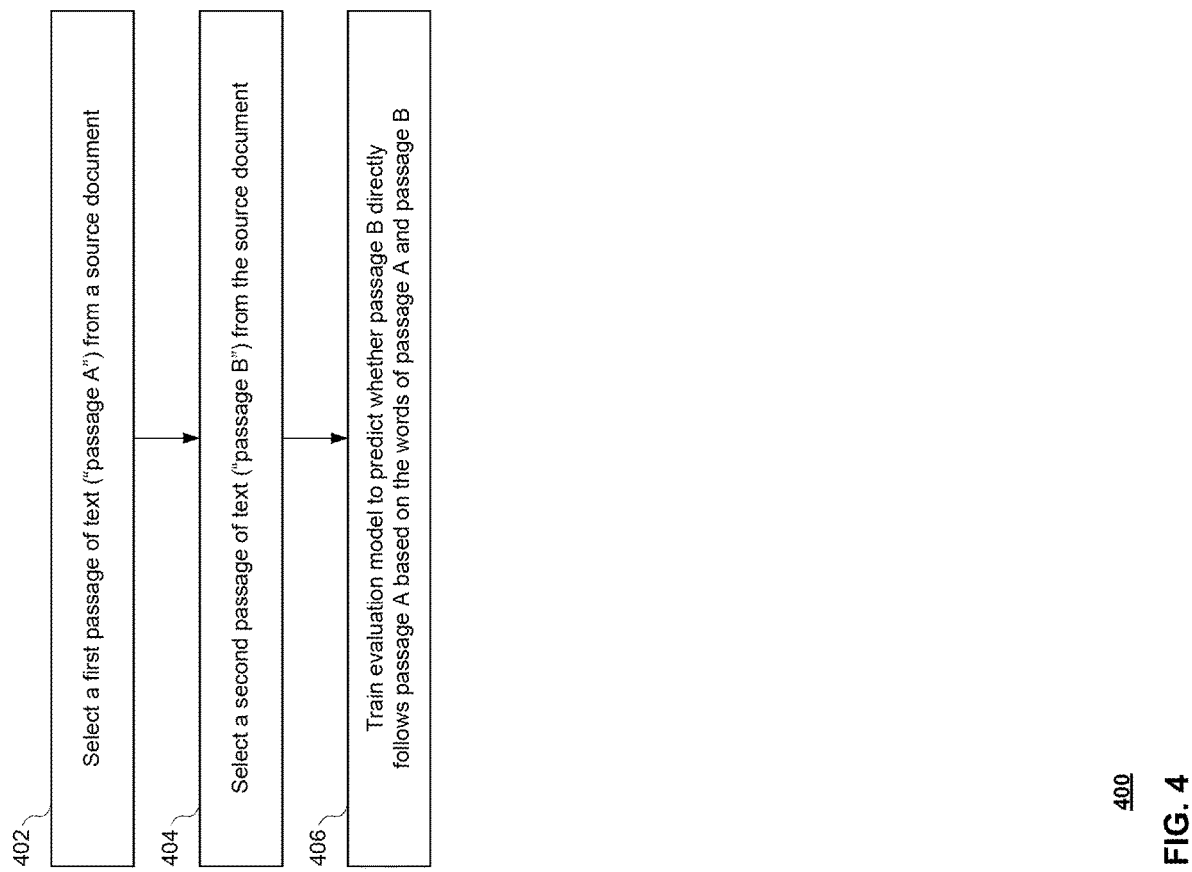
FIG. 4 is a flow diagram showing an exemplary method for pretraining the evaluation model using a next-sentence prediction task, according to aspects of the disclosure.

With further regard to element 208, FIG. 4 is a flow diagram showing an exemplary method 400 for pretraining the evaluation model using a next-sentence prediction task, according to aspects of the disclosure. In that regard, in step 402, a first passage of text ("passage 1") is selected from a source document (e.g., a webpage from Wikipedia, a book, a news article). Likewise, in step 404, a second passage of text ("passage 2") is selected from the same source document. In the example of FIG. 4, in 50% of the cases, passage 2 will be the text that directly follows passage 1 in the source document, and in 50% of cases passage 2 will be some other nonsequential passage of text selected at random from the remainder of the source document. In this context, passages 1 and 2 may be sentence fragments, single sentences, passages containing more than one sentence, passages containing a fixed number of words, etc. Here as well, steps 402 and 404 may be performed manually (e.g., by a human), or automatically (e.g., by the evaluation model, by some other component of processing system 102, by some other processing system). Finally, in step 406, the evaluation model is trained to predict whether passage 2 directly follows passage 1 based on the words of passage 1 and passage 2. In this case as well, the evaluation model may be trained using any suitable loss function, such as a cross-entropy loss between the evaluation model's prediction and the known answer of each next-sentence prediction task.

In the example of FIGS. 2-4, the masked language modeling tasks and the next-sentence prediction tasks may be run in parallel. In that regard, the training steps shown in step 306 of FIG. 3 and step 406 of FIG. 4 may take place in parallel, and the evaluation model may be trained through an iterative process of calculating and summing each of the losses described above, and modifying the evaluation model's parameters, until the mean combined loss value becomes minimized (or begins approaching a minimum value). The number of steps necessary to adequately pretrain the evaluation model using such masked language modeling and next-sentence prediction tasks may vary depending on the size of the passages and the number of possible tokens. For example, adequate NLG pretraining may require 1,000,000 training steps (or more or less).

Pretraining Evaluation Model Using Synthetic Sentence Pairs

Following pretraining on any NLG pretraining tasks 204 (to the extent such is employed), the evaluation model is pretrained using synthetic sentence pairs as shown in element 210 of FIG. 2. The processing system 102 may generate these synthetic sentence pairs from a set of source documents (e.g., webpages from Wikipedia, books, news articles), as reflected in element 212. Although the term "sentence pairs" is used in this context for simplicity, a synthetic sentence pair need not include two full sentences. Rather, a synthetic sentence pair may in fact be a pair of sentence fragments, or a pair of text passages that each include more than one sentence, etc.

AS shown in element 212, the processing system 102 may generate one or more different types of synthetic sentence pairs from the set of source documents, such as: sentence pairs in which one or more words of an original passage A are randomly replaced in order to create an altered passage B (as reflected in element 214); sentence pairs in which one or more words of an original passage A are randomly omitted to create an altered passage B (as reflected in element 216); and sentence pairs in which an original passage A is translated into a different language, and then retranslated back into the original language in order to create an altered passage B (as reflected in element 218). Exemplary methods for generating the synthetic sentence pairs reflected in elements 214, 216, and 218 are set forth in FIGS. 5, 6, and 7, respectively.

Figure 5:
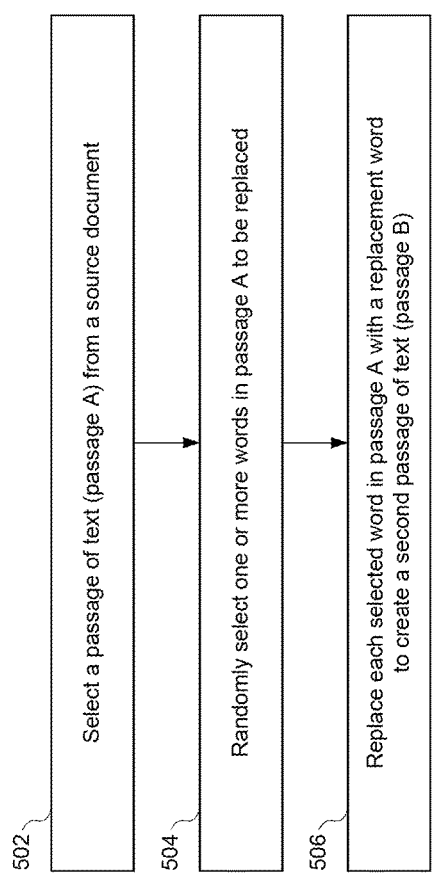
FIG. 5 is a flow diagram showing an exemplary method for generating a synthetic sentence pair using random substitutions, according to aspects of the disclosure.

In that regard, FIG. 5 is a flow diagram showing an exemplary method 500 for generating a synthetic sentence pair using random substitutions, according to aspects of the disclosure. In step 502, the processing system 102 samples a passage of text (passage A) from a source document. In step 504, the processing system 102 randomly selects one or more words from passage A to be replaced. Finally, in step 506, the processing system 102 replaces each selected word in passage A with a replacement word, resulting in a second passage of text (passage B). In the context of FIG. 5, passage A and passage B together form a "sentence pair." The replacement words referred to in step 506 may be obtained from any suitable source. For example, in some aspects of the technology, a separate NLG model may be trained to provide each replacement word, so that the sentence is lexically altered while maintaining fluency. Likewise, in some aspects of the technology, a thesaurus may be used to provide a replacement word that has a similar meaning (in at least some contexts) to the selected word. Further, in some aspects of the technology, replacement words may be chosen at random, without regard to maintaining fluency and/or overall meaning of the sentence.

Figure 6:
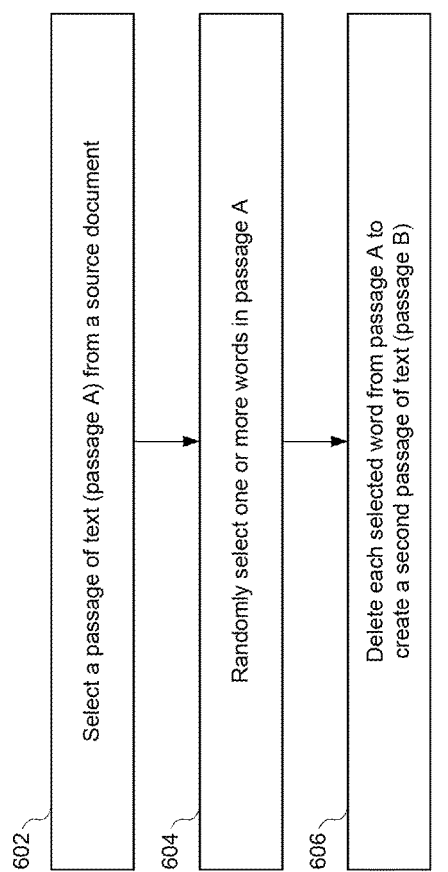
FIG. 6 is a flow diagram showing an exemplary method for generating a synthetic sentence pair using random omissions, according to aspects of the disclosure.

FIG. 6 is a flow diagram showing an exemplary method 600 for generating a synthetic sentence pair using random omissions, according to aspects of the disclosure. In step 602, the processing system 102 samples a passage of text (passage A) from a source document. In step 604, the processing system 102 randomly selects one or more words from passage A. Finally, in step 606, the processing system 102 deletes each selected word from passage A, resulting in a second passage of text (passage B). In the context of FIG. 6, passage A and passage B together form a "sentence pair."

Figure 7:
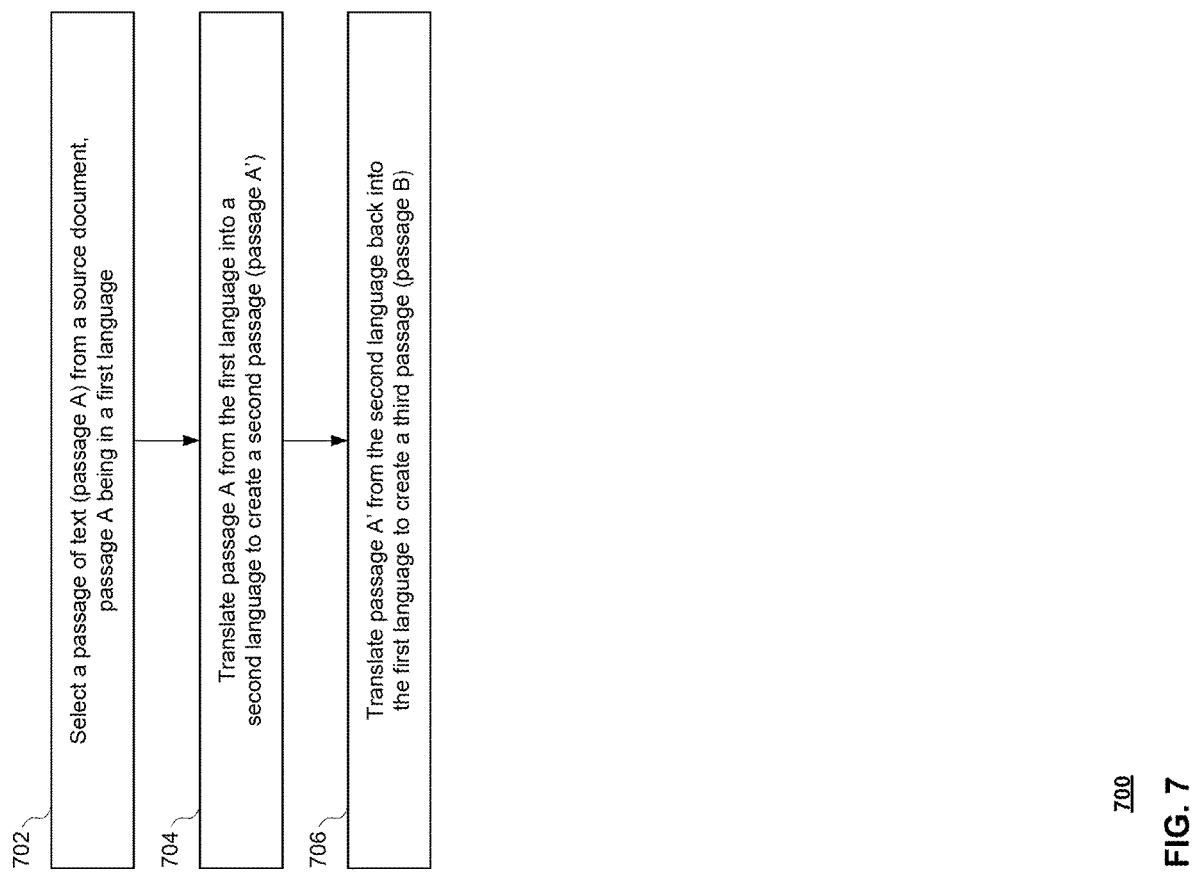
FIG. 7 is a flow diagram showing an exemplary method for generating a synthetic sentence pair using backtranslation, according to aspects of the disclosure.

FIG. 7 is a flow diagram showing an exemplary method 700 for generating a synthetic sentence pair using backtranslation, according to aspects of the disclosure. In step 702, the processing system 102 samples a passage of text (passage A) from a source document, with passage A being written in a first language (e.g., English). In step 704, the processing system 102 translates passage A from the first language into a second language (e.g., French, German), resulting in a second passage of text (passage A'). Finally, in step 706, the processing system 102 translates passage A' from the second language back into the first language, resulting in a third passage of text (passage B). In the context of FIG. 7, passage A and passage B together form a "sentence pair." With respect to steps 704 and 706, the processing system 102 may be configured to perform the translations between the first and second languages itself, or may be configured to obtain the translations from another processing system (e.g., a website available over one or more networks).

As shown in element 220, after the processing system 102 has generated synthetic sentence pairs, it may encode them with a set of training signals. In that regard, the processing system 102 may encode each synthetic sentence pair with training signals based on one or more of: a synthetic sentence pair generation flag (element 222); the output of one or more automatic metrics (element 224); the output of a learned backtranslation prediction model (element 226); and the output of a learned textual entailment model (element 228).

With respect to element 222, when the processing system 102 generates each synthetic sentence pair, it may also generate a Boolean flag indicating whether or not backtranslation was used to create the pair's "passage B." That Boolean flag may be encoded into the sentence pair as a training signal to be used in training the evaluation model, as described further below.

With respect to element 224, the processing system 102 may also evaluate each synthetic sentence pair using one or more existing automatic metrics, and encode each sentence pair with one or more training signals based on the score(s) produced by the one or more automatic metrics. Any suitable automatic metric or collection thereof may be used in this regard.

For example, in some aspects of the technology, each synthetic sentence pair may be evaluated using the BLEU metric, which calculates a score based on n-gram overlap between two passages. A training signal (e.g., a vector) may be encoded into each sentence pair that includes a value based on the sentence pair's BLEU score (e.g., the BLEU score itself, a normalized version of the BLEU score, etc.)

Likewise, in some aspects of the technology, each synthetic sentence pair may be evaluated using the ROUGE metric, which calculates three different scores based on n-gram overlap between two passages: a recall score indicating how many n-grams of passage A are repeated in passage B; a precision score indicating the percentage of the repeated n-grams relative to the total n-grams of passage B; and an F-score, which is a harmonic mean of the recall and precision scores. A training signal (e.g., a vector) may be encoded into each sentence pair that includes values based on one or more of the scores output by the ROUGE metric (e.g., one or more of the ROUGE scores themselves, normalized versions of one or more of ROUGE scores, etc.)

Further, in some aspects of the technology, each synthetic sentence pair may be evaluated using the BERTscore metric, which is a metric that combines learned contextual embeddings with specific token alignment rules to produce a recall, precision, and F-score. Here as well, a training signal (e.g., a vector) may be encoded into each sentence pair that includes values based on one or more of the scores output by the BERTscore metric for that sentence pair (e.g., one or more of the BERTscore scores themselves, normalized versions of one or more of BERTscore scores, etc.)

In some aspects of the technology, each sentence pair may be encoded with a first training signal based on the pair's BLEU score, a second training signal based on all three of the pair's ROUGE scores (recall, precision, and F-score), and a third training signal based on all three of the pair's BERTscore scores (recall, precision, and F-score). In some aspects of the technology, additional training signals may be based on other calculated or learned automatic metrics, and may be added to or substituted for one or more of those described herein.

With respect to element 226, the processing system 102 may also evaluate each synthetic sentence pair using a learned backtranslation prediction model. In that regard, a backtranslation prediction model may be trained to assess the probability that a first passage is a backtranslation of a second passage, or vice versa. The backtranslation model may be trained to make such a prediction based on translation between any two languages. For example, in some aspects of the technology, the backtranslation prediction model may be configured to analyze a sentence pair composed of passage A and passage B and return one or both of the following scores: (1) a score representing the likelihood that passage B is the result of translating passage A from English to French to get passage A', and translating passage A' from French back into English; and (2) a score representing the likelihood that passage A is the result of translating passage B from English to French to get passage B', and translating passage B' from French back into English.

Likewise, in some aspects, the backtranslation prediction model may be configured to make predictions based on translations between more than two languages. Thus, for example, the backtranslation prediction model may be configured analyze a sentence pair composed of passage A and passage B and return one or more of the following scores: (1) a score representing the likelihood that passage B is the result of translating passage A from English to French to get passage A', and translating passage A' from French back into English; (2) a score representing the likelihood that passage A is the result of translating passage B from English to French to get passage B', and translating passage B' from French back into English; (3) a score representing the likelihood that passage B is the result of translating passage A from English to German to get passage A', and translating passage A' from German back into English; and (4) a score representing the likelihood that passage A is the result of translating passage B from English to German to get passage B', and translating passage B' from German back into English. A training signal (e.g., a vector) may be encoded into each sentence pair that includes values based on one or more such scores output by the backtranslation prediction model for that sentence pair (e.g., one or more values actually output by the backtranslation prediction model, normalized versions of one or more values output by the backtranslation prediction model, etc.).

With respect to element 228, the processing system 102 may also evaluate each synthetic sentence pair using a learned textual entailment model. The textual entailment model may be trained to assign a probability that a first passage entails (tends to confirm or be in agreement with) a second passage, contradicts the second passage, or neither entails nor contradicts the second passage and is thus neutral. A training signal (e.g., a vector) may be encoded into each sentence pair that includes values based on the entailment, contradiction, and neutrality probabilities output by the textual entailment model for that sentence pair (e.g., the actual predictions output by the textual entailment model, normalized versions of the textual entailment model's predictions, etc.)

After the processing system 102 has encoded each synthetic sentence pair with one or more training signals as just described, they are used to train the evaluation model. In that regard, the evaluation model is fed each synthetic sentence pair (without the encoded training signals), and is trained to predict each score based on the text of the synthetic sentence pairs. In each training step, the model's predictions are compared to each respective training signal and a loss value is generated. Although any suitable loss function(s) may be used, in the example of FIG. 2, the processing system 102 calculates: (1) a multi-class loss between each of the evaluation model's predictions and any respective training signals based on synthetic sentence pair generation flags (element 232 of FIG. 2); (2) a regression loss between each of the evaluation model's predictions and any respective training signals based on automatic metrics (element 234 of FIG. 2); (3) a regression loss between each of the evaluation model's predictions and any respective training signals based on a backtranslation prediction model (element 236 of FIG. 2); and (4) a multi-class loss between each of the evaluation model's predictions and any respective training signals based on a textual entailment model (element 238 of FIG. 2). Here as well, the evaluation model may be trained through an iterative process of calculating and summing each of the losses described above, and modifying the evaluation model's parameters, until the mean combined loss value becomes minimized (or begins approaching a minimum value). The number of steps necessary to adequately pretrain the evaluation model using encoded synthetic sentence pairs may vary depending on the size of the passages, the number of possible tokens, the number of training signals, etc. For example, adequate pretraining using the tasks and training signals just described may require between 400,000 and 800,000 training steps (or more or less).

Fine-tuning Evaluation Model Using Human-Rated Sentence Pairs

As shown in elements 240 and 242 of FIG. 2, after the evaluation model has been pretrained using NLG pretraining tasks and synthetic sentence pairs as described above, it may be further fine-tuned using human-graded sentence pairs. As above, although the term "sentence pairs" is used for simplicity, a human-graded "sentence pair" need not include two full sentences, and may instead include sentence fragments, passages including more than one sentence, etc. In this fine-tuning stage, the evaluation model is trained to predict the human-allocated grade for each sentence-pair. Thus, the human-allocated grade may be used as a training signal, and a loss may be calculated between the evaluation model's prediction for each sentence pair and the respective human-allocated grade. Any suitable loss function may be used for this, such as a regression loss between the evaluation model's prediction and the human-allocated grade.

Here as well, the evaluation model may be fine-tuned through an iterative process of calculating and summing each loss value, and modifying the evaluation model's parameters, until the mean combined loss becomes minimized (or begins approaching a minimum value). The number of steps necessary to adequately fine-tune the evaluation model using encoded synthetic sentence pairs may vary depending on the size of the passages. For example, adequate fine-tuning using human-graded sentence pairs may require 40,000 training steps (or more or less).

The present technology may be used to assess any type of NLG output such as data-to-text summaries, machine-translation, conversational AI, etc., and the data used to fine-tune the evaluation model may be tailored to such intended use. Thus, in some aspects of the technology, the human-graded sentence pairs may include ones in which the first "sentence" is a reference passage created by a human based on some data (e.g., a human-generated sentence based on data about a sports match, and summarizing the outcome of the sports match), the second "sentence" is a passage that was synthetically generated by an NLG model based on that data, and the human-allocated grade is a score that has been allocated by a different human assessing how well the NLG-generated passage compares to the human-generated passage. Likewise, in some aspects of the technology, the human-graded sentence pairs may include ones in which the first "sentence" is a source passage written in a first language, the second "sentence" is a NLG-generated machine-translation of the first "sentence" into a second language, and the human-allocated grade represents how accurately the second passage is believed to capture the meaning of the first passage.

In addition, in some aspects of the present technology, the "sentence pairs" used for fine-tuning need not be the only information provided to the evaluation model, and thus may be augmented with further context. For example, for a "sentence pair" in which a human-graded reference sentence and an NLG-model-generated candidate sentence were both created by summarizing a passage of text, that passage of text may be provided to the evaluation model as additional input to be weighed in determining how well the NLG-generated passage compares to the human-generated passage. Likewise, for a "sentence pair" in which a human-graded reference sentence and an NLG-model-generated candidate sentence both represent a responsive communication in a written conversation, a log of that past conversation may be provided to the evaluation model as additional input to be weighed in determining how well the NLG-generated passage compares to the human-generated passage.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A method of training a neural network, comprising:
generating, by one or more processors of a processing system, a plurality of synthetic sentence pairs, each synthetic sentence pair of the plurality of synthetic sentence pairs comprising an original passage of text and a modified passage of text;
generating, by the one or more processors, for each given synthetic sentence pair of the plurality of synthetic sentence pairs:
a first training signal of a plurality of training signals based on whether the given synthetic sentence pair was generated using backtranslation; and
one or more second training signals of the plurality of training signals based on a prediction from a backtranslation prediction model regarding a likelihood that one of the original passage of text or the modified passage of text of the given synthetic sentence pair could have been generated by backtranslating the other one of the original passage of text or the modified passage of text of the given synthetic sentence pair;
pretraining, by the one or more processors, the neural network to predict, for each given synthetic sentence pair of the plurality of synthetic sentence pairs, the plurality of training signals for the given synthetic sentence pair; and
fine-tuning, by the one or more processors, the neural network to predict, for each given human-graded sentence pair of a plurality of human-graded sentence pairs, a grade allocated by a human grader to the given human-graded sentence pair.

2. The method of claim 1, further comprising:
pretraining, by the one or more processors, the neural network to predict a mask token in each of a plurality of masked language modeling tasks; and
pretraining, by the one or more processors, the neural network to predict, for each given next-sentence prediction task of a plurality of next-sentence prediction tasks, whether a second passage of text of the given next-sentence prediction task directly follows a first passage of text of the given next-sentence prediction task.

3. The method of claim 2, further comprising:
generating, by the one or more processors, the plurality of masked language modeling tasks; and
generating, by the one or more processors, the plurality of next-sentence prediction tasks.

4. The method of claim 1, wherein generating the plurality of synthetic sentence pairs comprises, for each given synthetic sentence pair of a first subset of the synthetic sentence pairs:
translating, by the one or more processors, the original passage of text of the given synthetic sentence pair from a first language into a second language, to create a translated passage of text; and translating, by the one or more processors, the translated passage of text from the second language into the first language, to create the modified passage of text of the given synthetic sentence pair.

5. The method of claim 4, wherein generating the plurality of synthetic sentence pairs comprises, for each given synthetic sentence pair of a second subset of the synthetic sentence pairs, substituting one or more words of the original passage of text of the given synthetic sentence pair to create the modified passage of text of the given synthetic sentence pair.

6. The method of claim 5, wherein generating the plurality of synthetic sentence pairs further comprises, for each given synthetic sentence pair of a third subset of the synthetic sentence pairs, removing one or more words of the original passage of text of the given synthetic sentence pair to create the modified passage of text of the given synthetic sentence pair.

7. The method of claim 1, further comprising generating, by the one or more processors, for each given synthetic sentence pair of the plurality of synthetic sentence pairs:
one or more third training signals of the plurality of training signals based on one or more scores generated by comparing the original passage of text of the given synthetic sentence pair to the modified passage of text of the given synthetic sentence pair using one or more automatic metrics.

8. The method of claim 7, wherein the one or more automatic metrics includes at least one of the BLEU metric, the ROUGE metric, or the BERTscore metric.

9. The method of claim 7, further comprising generating, by the one or more processors, for each given synthetic sentence pair of the plurality of synthetic sentence pairs:
one or more fourth training signals of the plurality of training signals based on a prediction from a textual entailment model regarding a likelihood that the modified passage of text of the given synthetic sentence pair entails or contradicts the original passage of text of the given synthetic sentence pair.

10. The method of claim 1, further comprising generating, by the one or more processors, for each given synthetic sentence pair of the plurality of synthetic sentence pairs:
one or more fourth training signals of the plurality of training signals based on a prediction from a textual entailment model regarding a likelihood that the modified passage of text of the given synthetic sentence pair entails or contradicts the original passage of text of the given synthetic sentence pair.

11. A processing system comprising:
a memory; and
one or more processors coupled to the memory and configured to:
generate a plurality of synthetic sentence pairs, each synthetic sentence pair of the plurality of synthetic sentence pairs comprising an original passage of text and a modified passage of text;
generate, for each given synthetic sentence pair of the plurality of synthetic sentence pairs:
a first training signal of a plurality of training signals based on whether the given synthetic sentence pair was generated using backtranslation; and
one or more second training signals of the plurality of training signals based on a prediction from a backtranslation prediction model regarding a likelihood that one of the original passage of text or the modified passage of text of the given synthetic sentence pair could have been generated by backtranslating the other one of the original passage of text or the modified passage of text of the given synthetic sentence pair;
pretrain a neural network to predict, for each given synthetic sentence pair of the plurality of synthetic sentence pairs, the plurality of training signals for the given synthetic sentence pair; and
fine-tune the neural network to predict, for each given human-graded sentence pair of a plurality of human-graded sentence pairs, a grade allocated by a human grader to the given human-graded sentence pair.

12. The system of claim 11, wherein the one or more processors are further configured to:
pretrain the neural network to predict a mask token in each of a plurality of masked language modeling tasks; and
pretrain the neural network to predict, for each given next-sentence prediction task of a plurality of next-sentence prediction tasks, whether a second passage of text of the given next-sentence prediction task directly follows a first passage of text of the given next-sentence prediction task.

13. The system of claim 12, wherein the one or more processors are further configured to:
generate the plurality of masked language modeling tasks; and
generate the plurality of next-sentence prediction tasks.

14. The system of claim 11, wherein the one or more processors being configured to generate the plurality of synthetic sentence pairs comprises being configured to, for each given synthetic sentence pair of a first subset of the synthetic sentence pairs:
translate the original passage of text of the given synthetic sentence pair from a first language into a second language, to create a translated passage of text; and
translate the translated passage of text from the second language into the first, language, to create the modified passage of text of the given synthetic sentence pair.

15. The system of claim 14, wherein the one or more processors being configured to generate the plurality of synthetic sentence pairs further comprises being configured to, for each given synthetic sentence pair of a second subset of the synthetic sentence pairs, substitute one or more words of the original passage of text of the given synthetic sentence pair to create the modified passage of text of the given synthetic sentence pair.

16. The system of claim 15, wherein the one or more processors being configured to generate the plurality of synthetic sentence pairs further comprises being configured to, for each given synthetic sentence pair of a third subset of the synthetic sentence pairs, remove one or more words of the original passage of text of the given synthetic sentence pair to create the modified passage of text of the given synthetic sentence pair.

17. The system of claim 11, wherein the one or more processors are further configured to generate, for each given synthetic sentence pair of the plurality of synthetic sentence pairs:
one or more third training signals of the plurality of training signals based on one or more scores generated by comparing the original passage of text of the given synthetic sentence pair to the modified passage of text of the given synthetic sentence pair using one or more automatic metrics.

18. The system of claim 17, wherein the one or more automatic metrics includes at least one of the BLEU metric, the ROUGE metric, or the BERTscore metric.

19. The system of claim 17, wherein the one or more processors are further configured to generate, for each given synthetic sentence pair of the plurality of synthetic sentence pairs:

one or more fourth training signals of the plurality of training signals based on a prediction from a textual entailment model regarding a likelihood that the modified passage of text of the given synthetic sentence pair entails or contradicts the original passage of text of the given synthetic sentence pair.

20. The system of claim 11, wherein the one or more processors are further configured to generate, for each given synthetic sentence pair of the plurality of synthetic sentence pairs:

one or more fourth training signals of the plurality of training signals based on a prediction from a textual entailment model regarding a likelihood that the modified passage of text of the given synthetic sentence pair entails or contradicts the original passage of text of the given synthetic sentence pair.

\* \* \* \* \*